(12) United States Patent
Matsushita et al.

(10) Patent No.: US 7,676,670 B2
(45) Date of Patent: Mar. 9, 2010

(54) POWER SUPPLY CONTROL DEVICE AND METHOD, PROGRAM, AND RECORDING/PLAYBACK APPARATUS

(75) Inventors: Masaki Matsushita, Kanagawa (JP); Yoshio Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 11/469,707

(22) Filed: Sep. 1, 2006

(65) Prior Publication Data

US 2007/0083776 A1   Apr. 12, 2007

(30) Foreign Application Priority Data

Sep. 8, 2005   (JP) .............................. 2005-260675

(51) Int. Cl.
*G06F 9/445* (2006.01)
*G06F 1/24* (2006.01)

(52) U.S. Cl. ................................ 713/2; 713/1; 713/100
(58) Field of Classification Search .................... 713/1, 713/2, 100
See application file for complete search history.

(56) References Cited

U.S. PATENT DOCUMENTS

| | | | | |
|---|---|---|---|---|
| 6,449,226 | B1* | 9/2002 | Kumagai | 369/47.1 |
| 7,426,633 | B2* | 9/2008 | Thompson et al. | 713/2 |
| 2004/0078537 | A1* | 4/2004 | Fulghum | 711/165 |
| 2004/0187103 | A1* | 9/2004 | Wickham et al. | 717/168 |
| 2005/0179931 | A1* | 8/2005 | Yamaguchi et al. | 358/1.14 |
| 2005/0182822 | A1* | 8/2005 | Daniel et al. | 709/213 |
| 2006/0041737 | A1* | 2/2006 | Kumagai | 713/1 |

FOREIGN PATENT DOCUMENTS

| | | |
|---|---|---|
| JP | 2-44414 | 2/1990 |
| JP | 7-281884 | 10/1995 |
| JP | 11-143592 | 5/1999 |
| JP | 11-305929 | 11/1999 |
| JP | 11-338690 | 12/1999 |
| JP | 2000-347845 | 12/2000 |
| JP | 2001-94620 | 4/2001 |
| JP | 2001-265468 | 9/2001 |
| JP | 2002-373037 | 12/2002 |
| JP | 2003-241861 | 8/2003 |
| JP | 2005-165885 | 6/2005 |
| JP | 02005165535 A * | 6/2005 |

* cited by examiner

*Primary Examiner*—Thomas Lee
*Assistant Examiner*—James Henson
(74) *Attorney, Agent, or Firm*—Oblon, Spivak, McClelland, Maier & Neustadt, L.L.P.

(57) ABSTRACT

A power supply control device includes a first signal output unit that outputs a re-power signal and an off-ready signal, the re-power signal being a signal for turning off the power supply of an apparatus for a predetermined period of time and then turning on the power supply of the apparatus, the off-ready signal indicating that the power supply of the apparatus is ready to be turned off; a second signal output unit that outputs a power-off enable signal for turning off the power supply of the apparatus to a power supply unit when the re-power signal and the off-ready signal are supplied to the second signal output unit; and a holding unit that holds the power-off enable signal for the predetermined period of time.

10 Claims, 4 Drawing Sheets

POWER SUPPLY CONTROL DEVICE AND METHOD, PROGRAM, AND RECORDING/PLAYBACK APPARATUS

CROSS REFERENCES TO RELATED APPLICATIONS

The present invention contains subject matter related to Japanese Patent Application JP 2005-260675 filed in the Japanese Patent Office on Sep. 8, 2005, the entire contents of which are incorporated herein by reference.

BACKGROUND OF THE INVENTION

1. Field of the Invention

The present invention relates to power supply control devices and methods, programs, and recording/playback apparatuses. More specifically, the present invention relates to a power supply control device and method for safely and securely re-powering an apparatus, a program, and a recording/playback apparatus.

2. Description of the Related Art

Devices for performing predetermined processing according to programs are available, such as central processing units (CPUs), complex programmable logic devices (CPLDs), and field programmable gate alleys (FPGAs).

A technique that ensures that a program (or firmware) on a flash memory is updated is disclosed in, for example, Japanese Unexamined Patent Application Publication No. 11-338690.

One method for updating a program executed by a device is to restart (or reboot) an apparatus while turning on the power supply of the apparatus. Another method is to turn off and then turn on the power supply of an apparatus (or re-power the apparatus).

SUMMARY OF THE INVENTION

However, a user located near the apparatus needs to make sure that the power supply of the apparatus is ready to be turned off before turning off the power supply.

It is therefore desirable to more safely and securely re-power an apparatus.

According to an embodiment of the present invention, a power supply control device includes the following elements. First signal output means outputs a re-power signal and an off-ready signal, the re-power signal being a signal for turning off the power supply of an apparatus for a predetermined period of time and then turning on the power supply of the apparatus, the off-ready signal indicating that the power supply of the apparatus is ready to be turned off. Second signal output means outputs a power-off enable signal for turning off the power supply of the apparatus to a power supply unit when the re-power signal and the off-ready signal are supplied to the second signal output means. Holding means holds the power-off enable signal for the predetermined period of time.

The first signal output means may not output the off-ready signal during updating of a program stored in the apparatus.

The apparatus may be a recording/playback apparatus configured to record or play back data, and the first signal output means may not output the off-ready signal during recording or playback of the data.

The first signal output means may output the re-power signal when a user performs a re-power operation for turning off the power supply of the apparatus for a predetermined period of time and then turning on the power supply of the apparatus.

The first signal output means may output the re-power signal when receiving via a network a re-power command for turning off the power supply of the apparatus for a predetermined period of time and then turning on the power supply of the apparatus.

The apparatus may include a unit for which the updating of a program is activated only by turning off and on the power supply.

According to another embodiment of the present invention, a power supply method includes the steps of outputting a re-power signal and an off-ready signal, the re-power signal being a signal for turning off the power supply of an apparatus for a predetermined period of time and then turning on the power supply of the apparatus, the off-ready signal indicating that the power supply of the apparatus is ready to be turned off; outputting a power-off enable signal for turning off the power supply of the apparatus to a power supply unit when receiving the re-power signal and the off-ready signal; and holding the power-off enable signal for the predetermined period of time.

According to still another embodiment of the present invention, a program causes a computer to execute a process including the steps of outputting a re-power signal and an off ready, the re-power signal being a signal for turning off the power supply of an apparatus for a predetermined period of time and then turning on the power supply of the apparatus, the off-ready signal indicating that the power supply of the apparatus is ready to be turned off; outputting a power-off enable signal for turning off the power supply of the apparatus to a power supply unit when receiving the re-power signal and the off-ready signal; and holding the power-off enable signal for the predetermined period of time.

According to still another embodiment of the present invention, a recording/playback apparatus includes a power supply control device including the following elements. First signal output means outputs a re-power signal and an off-ready signal, the re-power signal being a signal for turning off the power supply of the recording/playback apparatus for a predetermined period of time and then turning on the power supply of the recording/playback apparatus, the off-ready signal indicating that the power supply of the recording/playback apparatus is ready to be turned off. Second signal output means outputs a power-off enable signal for turning off the power supply of the recording/playback apparatus to a power supply unit when the re-power signal and the off-ready signal are supplied to the second signal output means. Holding means holds the power-off enable signal for the predetermined period of time.

According to an embodiment of the present invention, a re-power signal for turning off the power supply of an apparatus for a predetermined period of time and then turning on the power supply of the apparatus, and an off-ready signal indicating that the power supply of the apparatus is ready to be turned off are output; a power-off enable signal for turning off the power supply of the apparatus is output to a power supply unit when both the re-power signal and the off-ready signal are received; and the power-off enable signal is held for the predetermined period of time.

The network is a mechanism to which at least two apparatuses are connected, in which information can be transmitted from one of the apparatuses to another apparatus. Apparatuses communicating with each other via the network may be independent apparatuses, or may be internal blocks that constitute a single apparatus.

According to an embodiment of the present invention, therefore, an apparatus can be more safely and securely re-powered.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, a power supply control device (e.g., an image capturing apparatus 1 shown in FIG. 2) includes first signal output means (e.g., a CPU 32 shown in FIG. 2) for outputting a re-power signal and an off-ready signal, the re-power signal being a signal for turning off the power supply of an apparatus for a predetermined period of time and then turning on the power supply of the apparatus, the off-ready signal indicating that the power supply of the apparatus is ready to be turned off; second signal output means (e.g., an AND circuit 54 shown in FIG. 2) for outputting a power-off enable signal for turning off the power supply of the apparatus to a power supply unit when the re-power signal and the off-ready signal are supplied to the second signal output means; and holding means (e.g., a timer circuit 53 shown in FIG. 2) for holding the power-off enable signal for the predetermined period of time.

According to another embodiment of the present invention, a power supply control method or program includes the steps of outputting (e.g., steps S12 and S15 shown in FIG. 4) a re-power signal and an off-ready signal, the re-power signal being a signal for turning off the power supply of an apparatus for a predetermined period of time and then turning on the power supply of the apparatus, the off-ready signal indicating that the power supply of the apparatus is ready to be turned off; outputting (e.g., step S16 shown in FIG. 4) a power-off enable signal for turning off the power supply of the apparatus to a power supply unit when receiving the re-power signal and the off-ready signal; and holding (e.g., step S17 shown in FIG. 4) the power-off enable signal for the predetermined period of time.

An embodiment of the present invention will be described with reference to the drawings.

Figure 1:
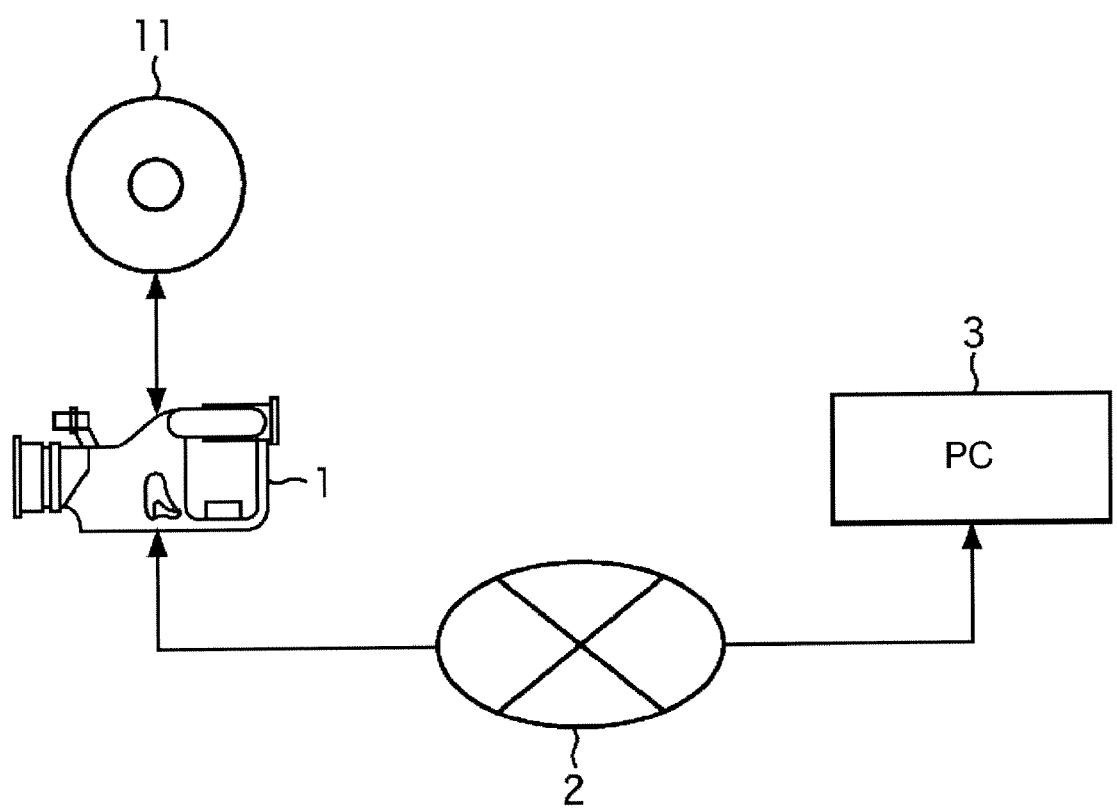
FIG. 1 is a block diagram showing an example structure of a recording system according to an embodiment of the present invention.

FIG. 1 shows an example structure of a recording system according to an embodiment of the present invention.

In the recording system shown in FIG. 1, an image capturing apparatus 1 is connected to a personal computer (PC) 3 via a network 2.

The image capturing apparatus 1 captures an image of a subject, and records the resulting captured data (audio signal and image signal) onto an optical disk 11 inserted in the image capturing apparatus 1.

The image capturing apparatus 1 is able to update a program for performing various types of processing, such as image capturing processing for capturing (photographing) an image of a subject and recording processing for recording the captured data onto the optical disk 11, by obtaining a program from the PC 3 that is distant from the image capturing apparatus 1 via the network 2 and installing the obtained program.

The PC 3 is located at a place distant from the image capturing apparatus 1, and is operated by a user, such as a system maintenance staff or service engineering staff of the image capturing apparatus 1. The PC 3 transmits a program (an update program) generated by the PC 3 to the image capturing apparatus 1 via the network 2.

While an optical disk is illustrated in FIG. 1, the image capturing apparatus 1 may record the captured data onto any other recording medium such as a semiconductor memory.

Figure 2:
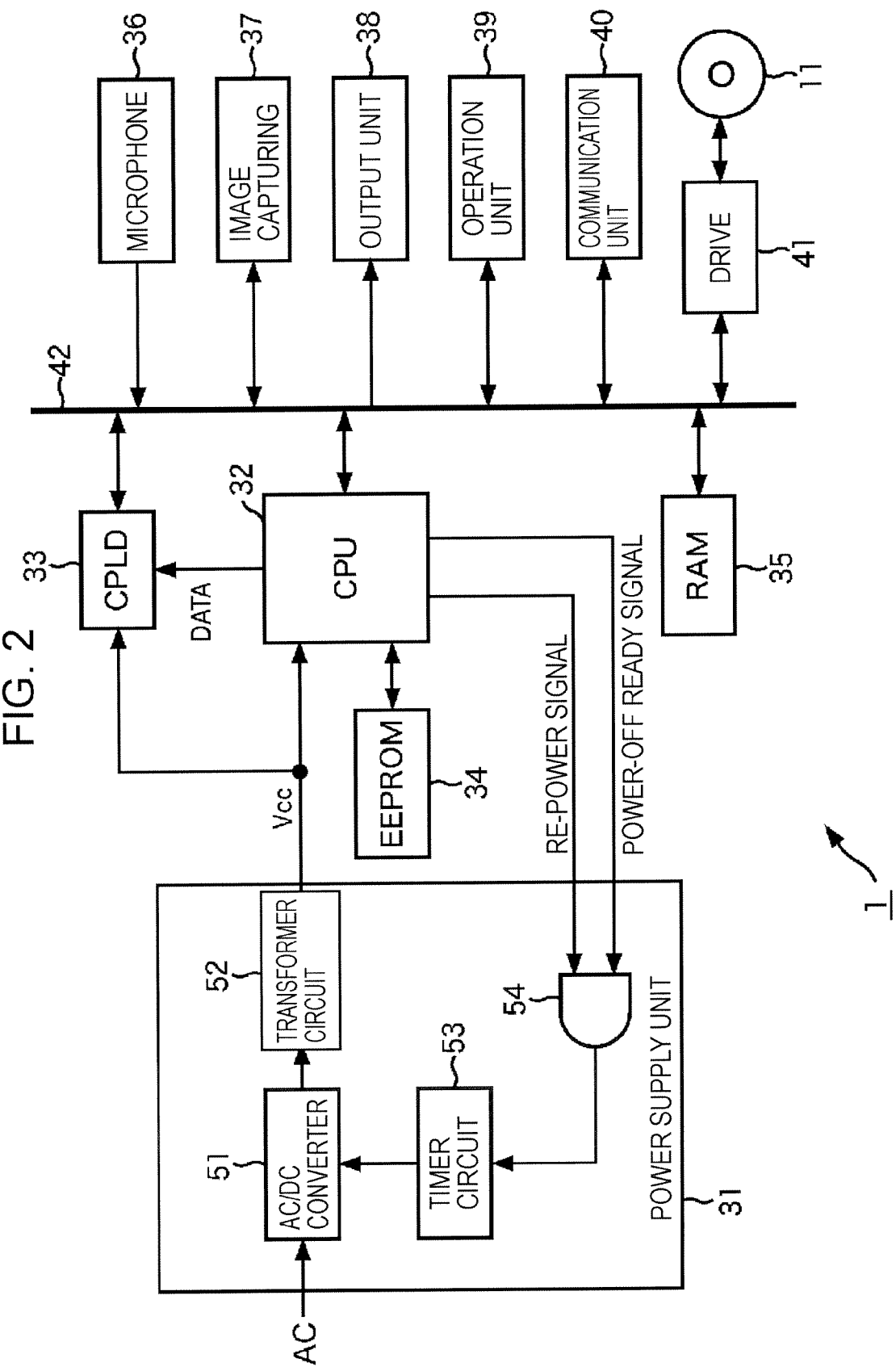
FIG. 2 is a block diagram showing a detailed example structure of an image capturing apparatus 1.

FIG. 2 is a block diagram showing a detailed example structure of the image capturing apparatus 1.

The image capturing apparatus 1 includes a power supply unit 31, a central processing unit (CPU) 32, a complex programmable logic device (CPLD) 33, an electronically erasable and programmable read only memory (EEPROM) 34, a random access memory (RAM) 35, a microphone 36, an image capturing unit 37, an output unit 38, an operation unit 39, a communication unit 40, a drive 41, and a bus 42. The power supply unit 31 includes an alternating-current-to-direct-current (AC/DC) converter 51, a transformer circuit 52, a timer circuit 53, and an AND circuit 54.

The power supply unit 31 converts an AC power supplied from an external source into DC power having a predetermined voltage, and supplies the DC power to the individual blocks in the image capturing apparatus 1, such as the CPU 32 and the CPLD 33.

Specifically, the AC/DC converter 51 converts the supplied AC power into DC power, and supplies the DC power to the transformer circuit 52. The AC/DC converter 51 does not supply the DC power to the transformer circuit 52 for a period of time during which a power-off enable signal is supplied from the timer circuit 53. The power-off enable signal instructs that the power supply be turned off. The transformer circuit 52 transforms the supplied DC power to a predetermined voltage Vcc, and supplies the voltage Vcc to the individual blocks in the image capturing apparatus 1, such as the CPU 32 and the CPLD 33. In FIG. 1, lines for supplying the power supply from the power supply unit 31 to the blocks other than the CPU 32 and the CPLD 33 are not illustrated.

When a power-off enable signal is supplied from the AND circuit 54, the timer circuit 53 outputs the power-off enable signal to the AC/DC converter 51. The timer circuit 53 latches (or holds) the output of the power-off enable signal for a predetermined period of time. The AND circuit 54 outputs the power-off enable signal to the timer circuit 53 when a re-power signal and a power-off ready signal are supplied from the CPU 32. The re-power signal instructs that the power supply of the image capturing apparatus 1 be turned off for a predetermined period of time and then turned on. The power-off ready signal indicates that the power supply of the image capturing apparatus 1 is ready to be turned off.

The CPU 32 performs various types of processing according to the program stored in the EEPROM 34. Specifically, the CPU 32 supplies a control signal to the image capturing unit 37, the communication unit 40, the drive 41, and the like via the bus 42 according to the program stored in the EEPROM 34 to control the individual blocks in the image capturing apparatus 1, thereby performing various types of processing, such as image capturing, encoding, recording, or playback processing.

The CPU 32 outputs the re-power signal to the AND circuit 54 when a re-power command is supplied from the operation unit 39 or the communication unit 40. The CPU 32 further monitors the current operational state of the image capturing apparatus 1, and outputs the power-off ready signal to the AND circuit 54 when the power supply of the image capturing apparatus 1 is ready to be turned off. For example, the CPU 32 checks whether or not the recording or playback of captured data is in progress on the drive 41, or checks whether or not the existing program is currently being updated to a new program (or a new version of the program is currently being installed).

The CPLD 33 establishes a logic circuit according to the supplied program (circuit information), and performs predetermined processing. The CPLD 33 is a device that needs the power supply to be turned off and on (that is, a device that needs the image capturing apparatus 1 to be re-powered) in order to enter a newly supplied program. The RAM 35 stores a program or data to be executed by the CPU 32, as necessary.

The microphone 36 supplies an audio signal obtained by collecting sound to the CPU 32 or the like via the bus 42. The image capturing unit 37 is formed of an imaging element, such as a charge coupled device (CCD) or complementmental oxide semiconductor (CMOS) imaging element. The image capturing unit 37 captures an image of a subject, and supplies the resulting image signal to the CPU 32 or the like via the bus 42.

The output unit 38 includes a display, such as a liquid crystal display (LCD), and a speaker. The output unit 38 displays a predetermined image on the display or outputs sound in response to an instruction from the CPU 32 or the CPLD 33.

The operation unit 39 includes operation buttons and switches. Upon receiving an operation given by the user, the operation unit 39 supplies an operation signal corresponding to the operation to the CPU 32.

The communication unit 40 communicates with an external apparatus (e.g., the PC 3 shown in FIG. 1) via the network 2 such as the Internet or a local area network.

The drive 41 drives the optical disk 11 placed therein to read (play back) the program or data recorded on the optical disk 11, and supplies the program or data to the CPU 32 or the like. The drive 41 further records the captured data supplied from the CPU 32 (the audio signal obtained by the microphone 36 and the image signal obtained by the image capturing unit 37) onto the optical disk 11.

In the image capturing apparatus 1, therefore, the CPU 32 that executes the loaded program and the CPLD 33 that establishes a predetermined logic circuit in accordance with the circuit information are used to control the operation of the image capturing apparatus 1.

When the user is to update the logic circuit of the CPLD 33, the user sends an update program (circuit information) to the image capturing apparatus 1 from the PC 3 via the network 2. The CPU 32 receives the update program via the communication unit 40, and supplies it to the CPLD 33.

In order to install (or activate) the update program into the CPLD 33, the CPU 32 turns off the power supply of the image capturing apparatus 1, and then turns on the power supply after the lapse of a predetermined period of time (e.g., several hundred milliseconds) (that is, the CPU 32 re-powers the image capturing apparatus 1).

A process for installing an update program and a process for re-powering the image capturing apparatus 1 will be described with reference to the flowcharts of FIGS. 3 and 4, respectively.

Figure 3:
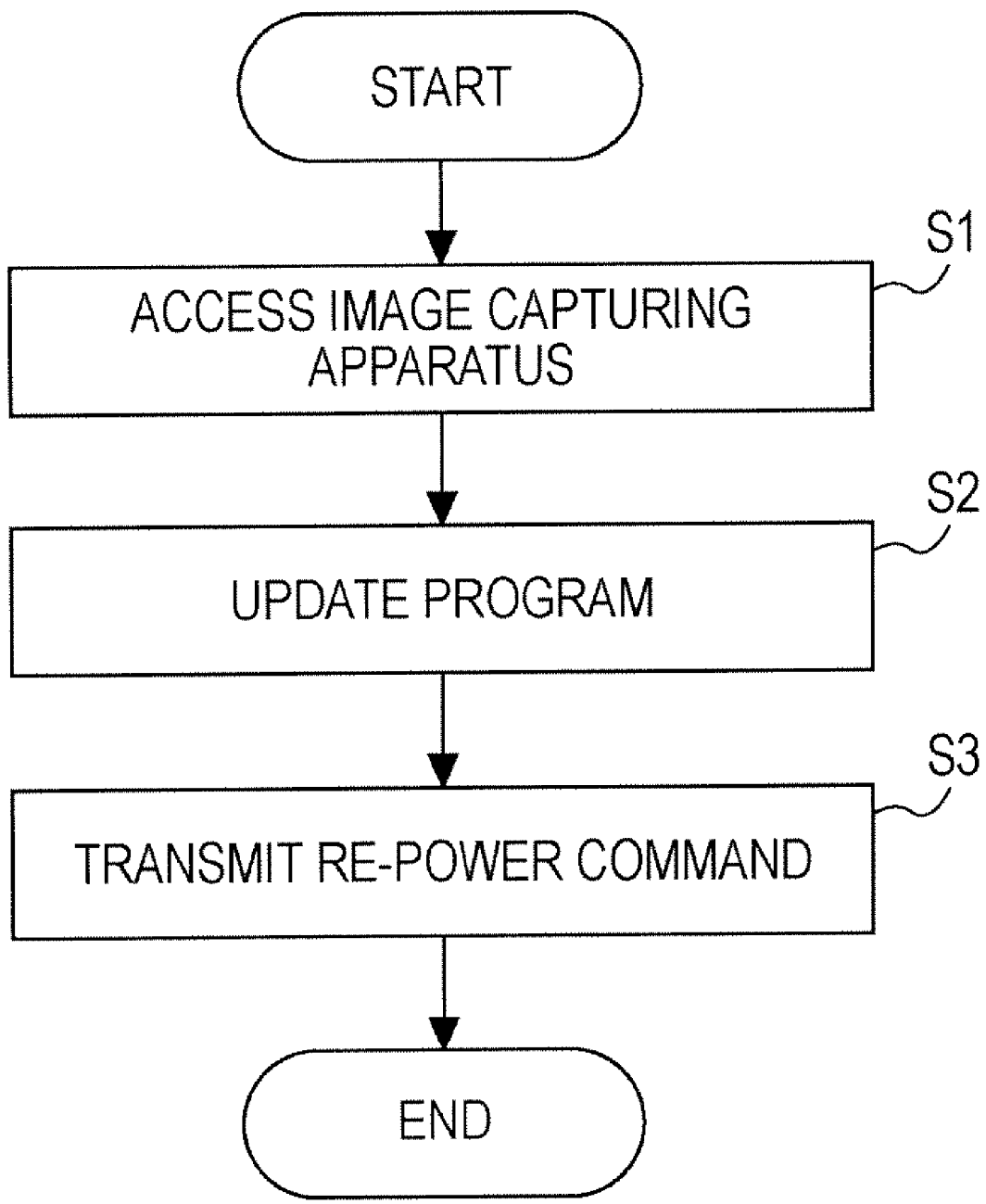
FIG. 3 is a flowchart showing a program updating process.

FIG. 3 is a flowchart showing a program updating process for allowing the PC 3 to update via the network 2 a program executed by the CPLD 33 of the image capturing apparatus 1.

When the user performs an operation to transmit a program executed by the CPLD 33 to the image capturing apparatus 1 using the PC 3, in step S1, the PC 3 accesses the image capturing apparatus 1 (to perform predetermined processing, such as authentication, and connect to the image capturing apparatus 1).

In step S2, the PC 3 transmits a program (an update program) to be installed in the CPLD 33 to the image capturing apparatus 1. In step S2, further, the CPU 32 of the image capturing apparatus 1 receives the transmitted program via the communication unit 40, and supplies the program to the CPLD 33, where the existing program is updated to the supplied program.

In order to activate the transmitted update program, the user performs an operation for re-powering the image capturing apparatus 1 using the personal computer 3. In step S3, the PC 3 transmits a re-power command to the image capturing apparatus 1 in accordance with the operation performed by the user. Then, the program updating process ends.

A re-power control process for the image capturing apparatus 1 will now be described with reference to the flowchart of FIG. 4.

First, in step S11, the CPU 32 determines whether or not a re-power command has been received, and waits for the reception of a re-power command.

If it is determined in step S11 that a re-power command has been received, then, in step S12, the CPU 32 outputs a re-power signal to the AND circuit 54. Then, the process proceeds to step S13.

In step S13, the CPU 32 determines whether or not the recording or playback of the captured image is in progress on the drive 41. If it is determined that the recording or playback of the captured image is in progress on the drive 41, the CPU 32 waits for the termination of the recording or playback (processing) of the captured image.

If it is determined in step S13 that the recording or playback of the captured image is not in progress on the drive 41, then, in step S14, the CPU 32 determines whether or not a program update is in progress. If it is determined in step S14 that a program update is in progress, the process returns to step S13, and it is determined again whether or not the recording or playback of the captured data is in progress on the drive 41.

If it is determined in step S14 that a program update is not in progress, that is, if the recording or playback of the captured data is not in progress on the drive 41 and if a program update is not in progress, then, in step S15, the CPU 32 outputs a power-off ready signal to the AND circuit 54. Then, the process proceeds to step S16.

In step S16, the AND circuit 54 outputs a power-off enable signal to the timer circuit 53 in response to the reception of both the re-power signal and the power-off ready signal. Then, the process proceeds to step S17.

In step S17, the timer circuit 53 outputs the power-off enable signal to the AC/DC converter 51, and holds the output of the power-off enable signal for a predetermined period of time. Thus, the power supply unit 31 turns off the power supply to the CPU 32 and the CPLD 33 for the predetermined period of time during which the power-off enable signal is supplied from the timer circuit 53. Thereafter, the power is supplied again. Then, the process returns to step S11, and the subsequent processing is repeatedly performed.

Figure 4:
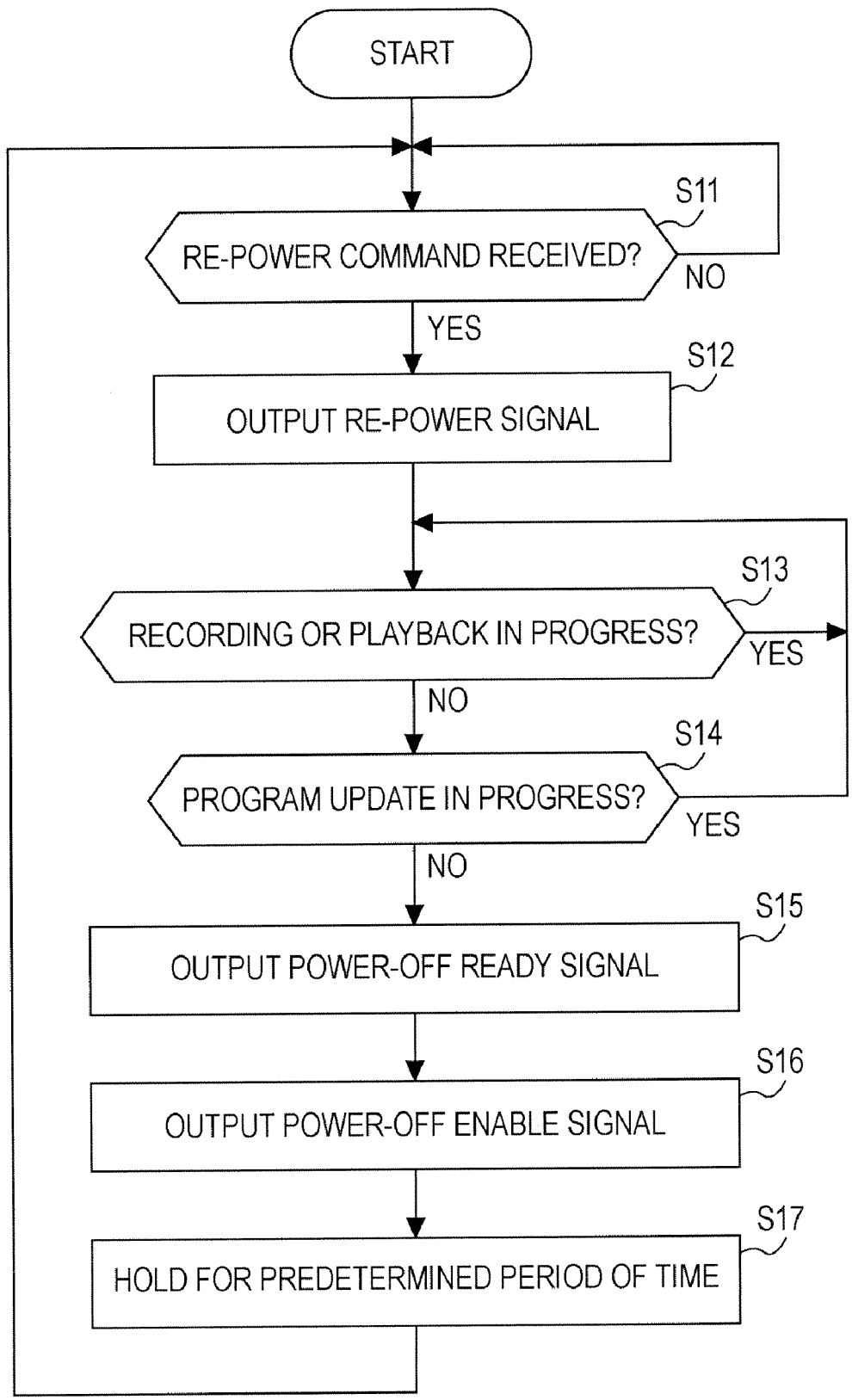
FIG. 4 is a flowchart showing a re-power control process.

In the flowchart shown in FIG. 4, there are performed sequentially the processing of steps S11 and S12 in which it is determined whether or not a re-power command has been received and a re-power signal is output when the re-power command has been received, and the processing of steps S13 through S15 in which it is determined whether or not the recording or playback of the captured data is in progress on the drive 41 and whether or not the existing program is currently being updated to a new program (or a new version of the program is currently being installed), and a power-off ready signal is output to the AND circuit 54 when the power supply of the image capturing apparatus 1 is ready to be turned off. However, the processing of steps S13 through S15 may be performed before the processing of steps S11 and S12, or the processing of steps S11 and S12 and the processing of steps S13 through S15 may be performed in parallel.

Accordingly, the power supply unit 31 turns off the power supply only when both the re-power signal and the power-off ready signal are supplied to the AND circuits 54. In other words, the power supply unit 31 has a power-off protection (or guard) function that prevents the power supply from being turned off if the power supply of the image capturing apparatus 1 is not ready to be turned off.

This allows the user to re-power the image capturing apparatus 1 using the PC 3 distant from the image capturing apparatus 1 without having to worry about the operational state of the image capturing apparatus 1. This ensures that the image capturing apparatus 1 can be safely and securely re-powered. Since the image capturing apparatus 1 are safely and securely re-powered, the updating of a program, which needs the image capturing apparatus 1 to be re-powered (that is, which needs the power supply to be turned off and then on), can be performed at a place distant from the image capturing apparatus 1.

While an example in which the image capturing apparatus 1 is re-powered remotely on the PC 3 (by transmitting a re-power command) has been described, the operator besides the image capturing apparatus 1 may operate the operation buttons or the like to re-power the image capturing apparatus 1. Also in this case, the protection function can be effectively performed.

Specifically, a user inserts the optical disk 11 having an update program (circuit information) recorded thereon into the drive 41 to read the update program from the optical disk 11 and install it in the CPLD 33.

In order to activate the update program, the user operates the operation buttons of the image capturing apparatus 1 to re-power the image capturing apparatus 1. Thus, the operation unit 39 outputs a re-power command to the CPU 32.

The CPU 32 receives the re-power command from the operation unit 39, and outputs a re-power signal to the AND circuit 54. The CPU 32 further monitors the current operational state of the image capturing apparatus 1 as to whether or not the recording or playback of captured data is in progress on the drive 41 and whether or not the program is currently being updated to a new program (or a new version of the program is currently being installed), and outputs a power-off ready signal to the AND circuit 54 only when the power supply of the image capturing apparatus 1 is ready to be turned off. Therefore, the image capturing apparatus 1 can be re-powered after making sure that the power supply of the image capturing apparatus 1 is ready to be turned off.

The operator besides the image capturing apparatus 1 is able to safely re-power the image capturing apparatus 1 without having to check whether or not the power supply of the image capturing apparatus 1 is ready to be turned off before re-powering the image capturing apparatus 1. A load on the operator can therefore be reduced.

While an image capturing apparatus configured to record or play back captured data obtained by capturing an image has been described by way of example, a recording and playback apparatus configured to record and play back external input data, which is not provided with an image capturing (photographing) function, or a record-only or playback-only apparatus may constitute an embodiment of the present invention.

Embodiments of the present invention may provide not only an apparatus having any other device than a CPLD for which an update program is activated by re-powering the apparatus but also an apparatus having a device, such as an FPGA, for which an update program is activated by a restart (or reboot) operation performed by a CPU.

The steps of the flowcharts defined herein may include processes that are executed sequentially in the orders described, and also include processes that are executed in parallel or individually, not necessarily sequentially.

In this specification, the term "system" implies the entire apparatus including a plurality of devices.

The embodiment described above is a mere example of embodiments of the present invention, and a variety of modifications may be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply control device comprising:

first signal output means for outputting a re-power signal and an off-ready signal, the re-power signal being a signal for turning off the power supply of an apparatus for a predetermined period of time and then turning on the power supply of the apparatus, the off-ready signal indicating that the power supply of the apparatus is to be turned off, wherein the off-ready signal is automatically generated whenever it is possible after the outputting of the re-power signal;

second signal output means for outputting a power-off enable signal to a power supply unit for turning off the power supply of the apparatus when the re-power signal and the off-ready signal are supplied to the second signal output means; and holding means, coupling to the second signal output means and the power supply unit, for holding the power-off enable signal to the power supply unit for the predetermined period of time.

2. The power supply control device according to claim 1, wherein the first signal output means does not output the off-ready signal during updating of a program stored in the apparatus.

3. The power supply control device according to claim 1, wherein:

the apparatus comprises a recording/playback apparatus configured to record or play back data; and the first signal output means does not output the off-ready signal during recording or playback of the data.

4. The power supply control device according to claim 1, wherein the first signal output means outputs the re-power signal when a user performs a re-power operation for turning off the power supply of the apparatus for a predetermined period of time and then turning on the power supply of the apparatus.

5. The power supply control device according to claim 1, wherein the first signal output means outputs the re-power signal when receiving via a network a re-power command for turning off the power supply of the apparatus for a predetermined period of time and then turning on the power supply of the apparatus.

6. The power supply control device according to claim 1, wherein the apparatus includes a unit for which the updating of a program is activated only by turning off and on the power supply.

7. A recording/playback apparatus comprising the power supply control device according to claim 1.

8. A power supply method comprising:
   outputting, from a signal processing unit, a re-power signal and an off-ready signal, the re-power signal being a signal for turning off the power supply of an apparatus for a predetermined period of time and then turning on the power supply of the apparatus, the off-ready signal indicating that the power supply of the apparatus is to be turned off, wherein the off-ready signal is automatically generated whenever it is possible after the outputting of the re-power signal;
   outputting, from a signal output unit, a power-off enable signal to a power supply unit for turning off the power supply of the apparatus on receiving the re-power signal and the off-ready signal; and
   holding, in a holding unit, the power off-enable signal to the power supply unit for the predetermined period of time, wherein the holding unit is coupled to the signal output unit and the power supply unit.

9. A computer-readable storage medium having embedded therein instructions, which when executed by a processor, cause the processor to perform a method comprising:
   outputting, from a signal processing unit, a re-power signal and an off-ready signal, the re-power signal being a signal for turning off the power supply of an apparatus for a predetermined period of time and then turning on the power supply of the apparatus, the off-ready signal indicating that the power supply of the apparatus is to be turned off, wherein the off-ready signal is automatically generated whenever it is possible after the outputting of the re-power signal;
   outputting, from a signal output unit, a power-off enable signal to a power supply unit for turning off the power supply of the apparatus on receiving the re-power signal and the off-ready signal; and
   holding, in a holding unit, the power off-enable signal to the power supply unit for the predetermined period of time, wherein the holding unit is coupled to the signal output unit and the power supply unit.

10. A power supply control device comprising:
    a signal processing unit that outputs a re-power signal and an off-ready signal, the re- power signal being a signal for turning off the power supply of an apparatus for a predetermined period of time and then turning on the power supply of the apparatus, the off-ready signal indicating that the power supply of the apparatus is ready to be turned off, wherein the off-ready signal is automatically generated whenever it is possible after the outputting of the re-power signal;
    a signal output unit that outputs a power-off enable signal to a power supply unit for turning off the power supply of the apparatus when the re-power signal and the off-ready signal are supplied to the signal output unit; and
    a holding unit, coupling to the signal output unit and the power supply unit, that holds the power-off enable signal to the power supply unit for the predetermined period of time.

\* \* \* \* \*